(12) United States Patent
Takaira et al.

(10) Patent No.: US 7,751,068 B2
(45) Date of Patent: Jul. 6, 2010

(54) DIGITAL COPYING MACHINE AND IMAGE DATA TRANSFER METHOD IN DIGITAL COPYING MACHINE

(75) Inventors: Masatoshi Takaira, Tokyo (JP); Tomonari Yoshimura, Kyoto (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1791 days.

(21) Appl. No.: 09/735,488

(22) Filed: Dec. 14, 2000

(65) Prior Publication Data

US 2002/0018232 A1 Feb. 14, 2002

(30) Foreign Application Priority Data

Dec. 14, 1999 (JP) ................................. 11-354627
May 17, 2000 (JP) .............................. 2000-145512

(51) Int. Cl.
G06F 3/12 (2006.01)
G06K 15/02 (2006.01)
H04N 1/32 (2006.01)

(52) U.S. Cl. ...................... 358/1.1; 358/1.15; 358/1.16; 358/501; 358/426.01

(58) Field of Classification Search ................. 382/317, 382/307; 355/18, 19, 401; 358/501, 1.15, 358/1.16, 409, 442, 468, 1.1, 426.01; 710/65, 710/100, 305, 107, 240, 241, 242, 243, 244, 710/309; 370/351, 362, 421, 423; 709/253
See application file for complete search history.

(56) References Cited

U.S. PATENT DOCUMENTS 5,021,892 A * 6/1991 Kita et al. .................... 358/468
5,579,452 A * 11/1996 Ambalavanar et al. ...... 358/1.16
5,581,613 A * 12/1996 Nagashima et al. ......... 380/201
5,726,768 A * 3/1998 Ishikawa et al. ............. 358/442
5,742,317 A * 4/1998 Kashihara .................... 347/131
6,480,968 B1 * 11/2002 Tsuzuki et al. .............. 713/600
2003/0090721 A1 * 5/2003 Miura et al. ............... 358/1.15

FOREIGN PATENT DOCUMENTS

JP 05-136769 6/1993
JP 5-136769 A 6/1993

(Continued)

OTHER PUBLICATIONS

Notice of Reason for Rejection issued in Japanese Patent Application No. 2000-145512, mailed Jan. 27, 2009, and translation thereof.

(Continued)

*Primary Examiner*—Edward L Coles
*Assistant Examiner*—Thomas J Lett
(74) *Attorney, Agent, or Firm*—Buchanan Ingersoll & Rooney PC

(57) ABSTRACT

A digital copying machine that performs transfer of image data from the image reader to an external computer based on an image reading operation, as well as transfer of image data from the external computer to the printing unit based on a printing operation using the same bus, wherein the image reading operation and the printing operation are performed simultaneously by alternating the two types of transfers in response to the signal, based on the operation timing of the printing unit.

14 Claims, 6 Drawing Sheets

FOREIGN PATENT DOCUMENTS

| | | |
|---|---|---|
| JP | 09-083690 | 3/1997 |
| JP | 9-83690 | 3/1997 |
| JP | 9-261401 A | 10/1997 |
| JP | 10-215355 | 8/1998 |
| JP | 10-336366 | 12/1998 |
| JP | 11-015770 | 1/1999 |

OTHER PUBLICATIONS

Office Action dated Sep. 29, 2009 in corresponding Application No. 2000-145512 with English Translation.

Notice of Reason for Rejection issued in corresponding Japanese Patent Application No. 2000-145512, and English translation.

* cited by examiner

DIGITAL COPYING MACHINE AND IMAGE DATA TRANSFER METHOD IN DIGITAL COPYING MACHINE

RELATED APPLICATION

This application is based on application Nos. 2000-145512 and 11-354627 filed in Japan, the entire content of which is hereby incorporated by reference.

BACKGROUND OF THE INVENTION

1. Field of the Invention

The present invention pertains to transfer of image data between a computer and a digital copying machine.

2. Description of the Related Art

Digital copying machines having a printer function have become known in recent years. A digital copying machine has a copier unit equipped with an image reader and a printing unit, a controller that causes the copier unit to operate as a printer, and a bus that connects the copier unit and the controller.

The scanner reads the image of the original document and generates scan image data. The printing unit performs printing based on the print image data generated for the purposes of printing. The controller has a function to transfer the scan image data output from the image reader to the client computer and a function to transfer the print image data output from the client computer to the printing unit.

Where the scan image data output from the image reader is transferred to the client computer, it is first sent to the controller via the bus. On the other hand, the print image data input from the client computer to the controller is transferred to the printing unit via the same bus.

However, because the bus is occupied during image data transfer, the image reading operation in which scan image data is sent from the image reader to the external computer and the printing operation in which print image data is transferred to the printing unit from the external computer may not be carried out simultaneously.

As one method to eliminate this inconvenience, it is possible to use one bus for the transfer of scan image data and another bus for the transfer of print image data. However, where two separate dedicated buses are used, hardware to transfer image data is also needed for each bus, which makes it difficult to keep the apparatus small in size, and also leads to the problem of increased cost.

SUMMARY OF THE INVENTION

The object of the present invention is to eliminate these problems.

Another object of the present invention is to provide a digital copying machine and image data transfer method that carry out an image reading operation in which scan image data is transferred to the external computer from the image reader and a printing operation in which print image data is transferred from the external computer to the printing unit using the same bus.

These and other objects are attained by means of a digital copying machine having an image reader that reads an image of the original document and generates image data, a printing unit that prints based on image data, a bus that transmits the image data generated by the image reader to an external computer and that transmits image data from the external computer to the printing unit, a signal generator that generates a signal based on an operation timing of the printing unit, and a controller that, in response to the signal, switches the bus between transmission from the image reader to the external computer and transmission from the external computer to the printing unit.

The invention itself, together with further objects and attendant advantages, will best be understood by reference to the following detailed description taken in conjunction with the accompanying drawings.

DESCRIPTION OF THE PREFERRED EMBODIMENT

The embodiments of the digital copying machine pertaining to the present invention are explained below with reference to the drawings.

First Embodiment

Figure 1:
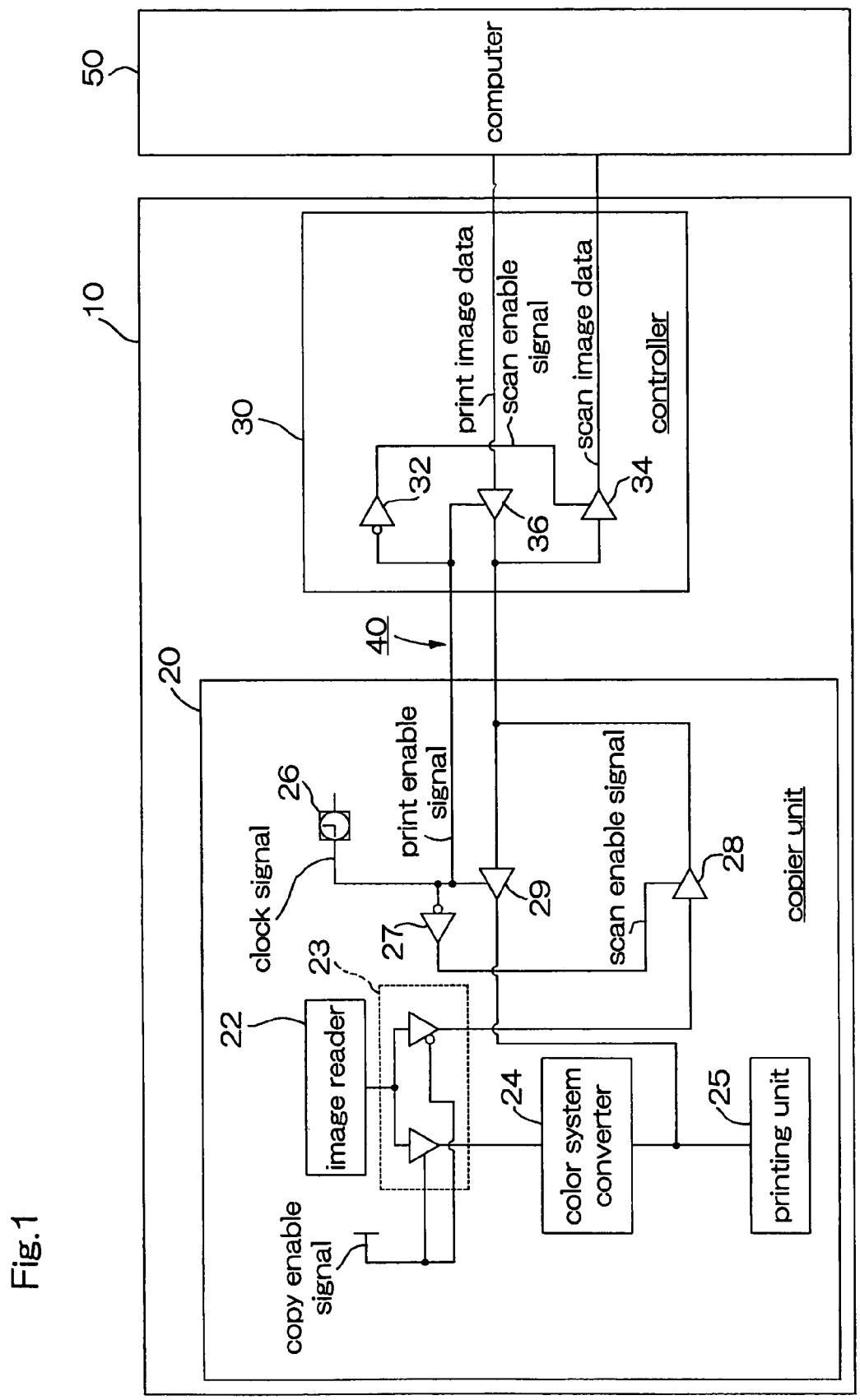
FIG. 1 is a block diagram showing a digital copying machine.

The digital copying machine 10 shown in FIG. 1 has a copier unit 20 that functions as a copying machine, a controller 30 that controls the transfer of image data between the copier unit 20 and the external computer 50, and a common bus 40 that connects the copier unit 20 and the controller 30.

The copier unit 20 has an image reader 22, a selector 23, a color system converter 24, a printing unit 25, a first signal generator 26, a second signal generator 27, a read buffer 28 and a print buffer 29.

The image reader 22 reads the image of the original document and sequentially generates scan image data for each color of red (R), green (G) and blue (B). The scan image data is image data comprising R, G and B color data, and is eight-bit data expressed in terms of 256 gradations per pixel. The selector 23 selects the output destination for the scan image data generated by the image reader 22 based on a copy enable signal.

The output destination is either the color system converter 24 or read buffer 28. The copy enable signal is based on an instruction issued using the operation panel. It is 'HI' when a copying operation, in which the image of the original document placed on the image reader 22 is printed by the printing unit 25, is instructed, and 'LO' when an image reading operation, in which the scan image data is transferred to the external computer from the image reader, is instructed. 'HI' refers to the rise of the signal, while 'LO' refers to the fall of the signal.

The color system converter 24 converts the scan image data into print image data. The print image data is image data used for printing, and comprises cyan (C), magenta (M), yellow (Y) and black (K) color data. The printing unit 25 prints out the print image data. The first signal generator 26 is a device that generates the clock signals shown in FIG. 2. The clock signal is a so-called pixel clock signal, and is a control signal indicating the operation timing for each pixel. Based on the clock signal, the second signal generator 27 generates a scan enable signal, which is a reversal of the clock signal.

The read buffer 28 temporarily stores the scan image data from the image reader 22, and it also transfers the scan image data stored in it to the controller 30 on a pixel basis based on the scan enable signal. The print buffer 29 temporarily stores the print image data from the controller 30, and transfers the print image data stored in it to the printing unit 25 on a pixel basis based on the print enable signal. The print enable signal is a signal equivalent to the clock signal.

Figure 3:
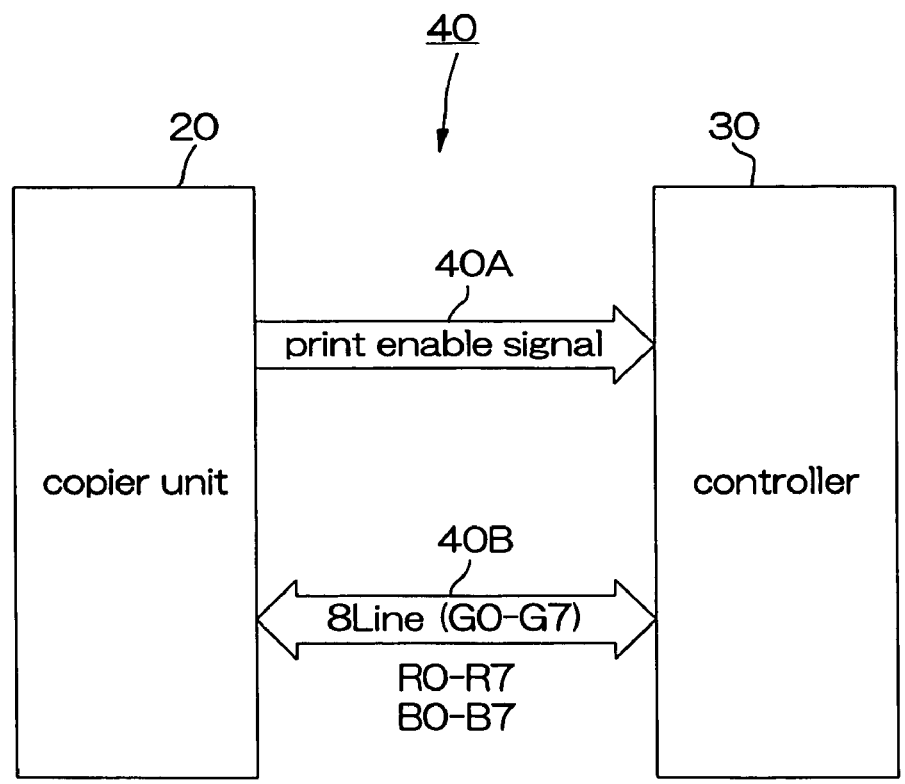
FIG. 3 is a summary block diagram to explain the image data transfer.

The bus 40 has a signal line 40A used to transfer the print enable signal from the copier unit 20 to the controller 30, and a bus member 40B used to serially transfer scan image data and print image data on a color and pixel basis as shown in FIG. 3. The bus member 40B comprises bound eight signal lines in order to transfer the eight-bit image data.

The controller 30 has a second signal generator 32, a read buffer 34 and a print buffer 36.

The second signal generator 32 outputs a scan enable signal based on the print enable signal transferred from the copier unit 20 via the signal line 40A. The read buffer 34 temporarily stores the scan image data output from the read buffer 28 of the copier unit 20 via the bus member 40B, and transfers the scan image data stored in it to the external computer 50 on a pixel basis based on the scan enable signal. The print buffer 36 temporarily stores print image data from the external computer 50, and transfers the print image data stored in it to the print buffer 29 of the copier unit 20 on a pixel basis based on the print enable signal.

In other words, the digital copying machine 10 has a transfer means that transfers scan image data to the external computer 50 and transfers to the printing unit 25 print image data generated by the external computer 50. Specifically, the transfer means comprises a first signal generator (clock signal generating means) 26 that generates clock signals and an alternate transfer means that alternately transfers scan image data and print image data via the common bus 40 in response to the rise and fall of the clock signal (the second signal generator 27, read buffer 28, print buffer 29, second signal generator 32, read buffer 34 and print buffer 36).

The copying operation in which the image of the original document placed on the image reader 22 is printed by the printing unit 25 will now be explained.

When copying is instructed by means of the operation panel, the copy enable signal becomes 'HI', and the selector 23 connects the image reader 22 and the color system converter 24. The image reader 22 reads the image of the original document and generates scan image data, which is then input to the color system converter 24. The color system converter 24 converts the scan image data, which comprises R, G and B image data, into print image data, which comprises CMYK image data, and inputs it to the printing unit 25. The printing unit 25 then prints out the print image data.

The image reading operation in which scan image data is transferred from the image reader to the external computer will now be explained.

When image reading is instructed by means of the operation panel, the copy enable signal becomes 'LO', and the selector 23 connects the image reader 22 and the read buffer 28. The image reader 22 reads the image of the original document and generates scan image data, which is then temporarily stored in the read buffer 28. On the other hand, the clock signal generated by the first signal generator 26 is input to the second signal generator 27. The scan enable signal generated by reversing the clock signal in the second signal generator 27 is input to the read buffer 28. The read buffer 28 outputs scan image data for one pixel when the scan enable signal becomes 'HI'. The scan image data for one pixel is transferred to the read buffer 34 of the controller 30 via the bus member 40B and temporarily stored there.

When this happens, the print enable signal has been input to the second signal generator 32 of the controller 30 via the signal line 40A. Therefore, the second signal generator 32 outputs a scan enable signal that is in synchronization with the scan enable signal output from the second signal generator 27 of the copier unit 20. The scan enable signal is input to the read buffer 34. As a result, as scan image data for one pixel is transferred from the read buffer 28 of the copier unit 20 to the read buffer 34 of the controller 30, scan image data for one pixel is transferred from the read buffer 34 to the external computer 50.

The printing operation in which print image data is transferred from the external computer to the printing unit will now be explained.

The print image data prepared by the external computer 50 is temporarily stored in the print buffer 36 of the controller 30. When the print enable signal that has been input to the print buffer 36 via the signal line 40A becomes 'HI', the print image data stored in the print buffer 36 is sequentially transferred on a pixel basis in the order of C, M, Y and K to the print buffer 29 of the copier unit 20 via the bus member 40B.

On the other hand, the print enable signal has been input to the print buffer 29 of the copier unit 20. In other words, a synchronized print enable signal has been input to the print buffer 36 and print buffer 29. As a result, as print image data for one pixel is transferred from the print buffer 36 of the controller 30 to the print buffer 29 of the copier unit 20, print image data for one pixel is transferred to the printing unit 25 from the print buffer 29. The printing unit 25 then prints out the print image data thus transferred.

The case in which an image reading operation and a printing operation are carried out at the same time will now be explained. Specifically, this is a case in which a printing operation wherein print image data is transferred to the printing unit 25 from the external computer 50 while an image reading operation, in which scan image data is transferred from the image reader 22 to the external computer 50, is underway, or a case in which an image reading operation wherein scan image data is transferred from the image reader 22 to the external computer 50 while a printing operation, in which print image data is transferred to the printing unit 25 from the external computer 50, is underway.

The scan image data generated by the image reader 22 is temporarily stored in the read buffer 28, and when the scan enable signal becomes 'HI', it is transferred to the read buffer 34 via the bus member 40B. On the other hand, the print image data prepared by the external computer 50 is temporarily stored in the print buffer 36 of the controller 30, and when the print enable signal becomes 'HI', it is transferred to the print buffer 29 via the bus member 40B.

Figure 2:
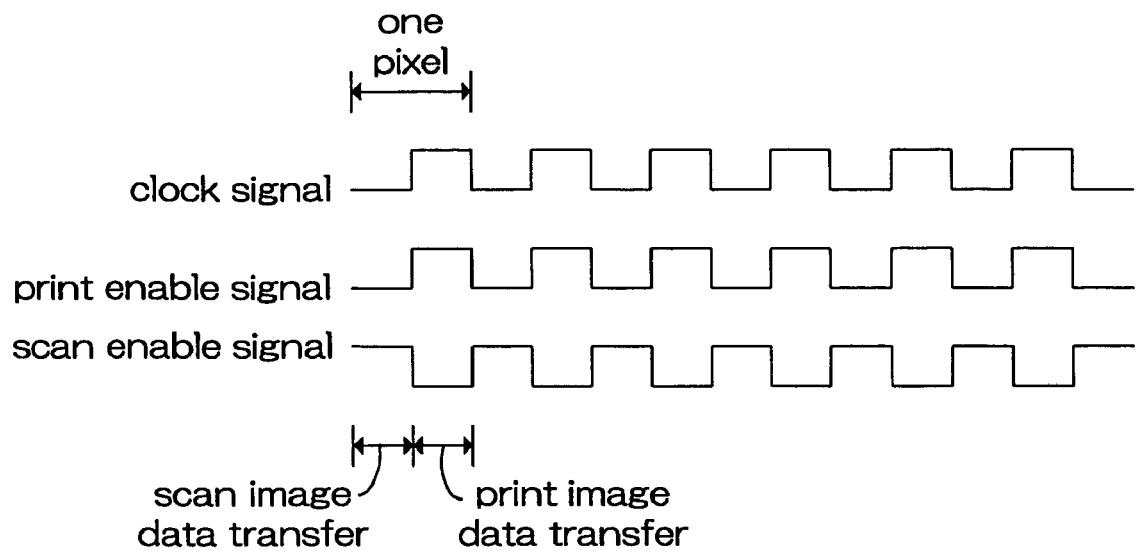
FIG. 2 is a drawing showing the timings for image data transfer.

The scan enable signal and print enable signal are based on the clock signal, and as shown in FIG. 2, their phases are off from each other by half a cycle, i.e., 180 degrees. Therefore, where the clock signal is 'LO', the scan enable signal is 'HI' and the print enable signal is 'LO'. On the other hand, where the clock signal is 'HI', the scan enable signal is 'LO' and the print enable signal is 'HI'. Therefore, where the clock signal is 'LO', scan image data for one pixel is transferred, and where the clock signal is 'HI', print image data for one pixel is transferred.

As described above, scan image data and print image data are alternately transferred on a pixel basis based on the cycle of the clock signal. Therefore, an image reading operation and a printing operation may be simultaneously carried out using the same bus.

The transfer speeds for scan image data and for print image data are the same. Further, while it is necessary to synchronize the transfer of scan image data and the transfer of print image data on a pixel basis, it is not necessary that the starting portion of the scan image data and that of the print image data match. For example, in order to simultaneously execute an image reading operation for scan image data for one page of an original document and a printing operation for print image data for one page of an original document, it is not necessary to transfer in a synchronous fashion the scan image data for the beginning of the page and the print image data for the beginning of the page as the starting data for the transfer. Therefore, scan image data and print image data may be transferred at any time.

Modified Example of First Embodiment

Figure 4:
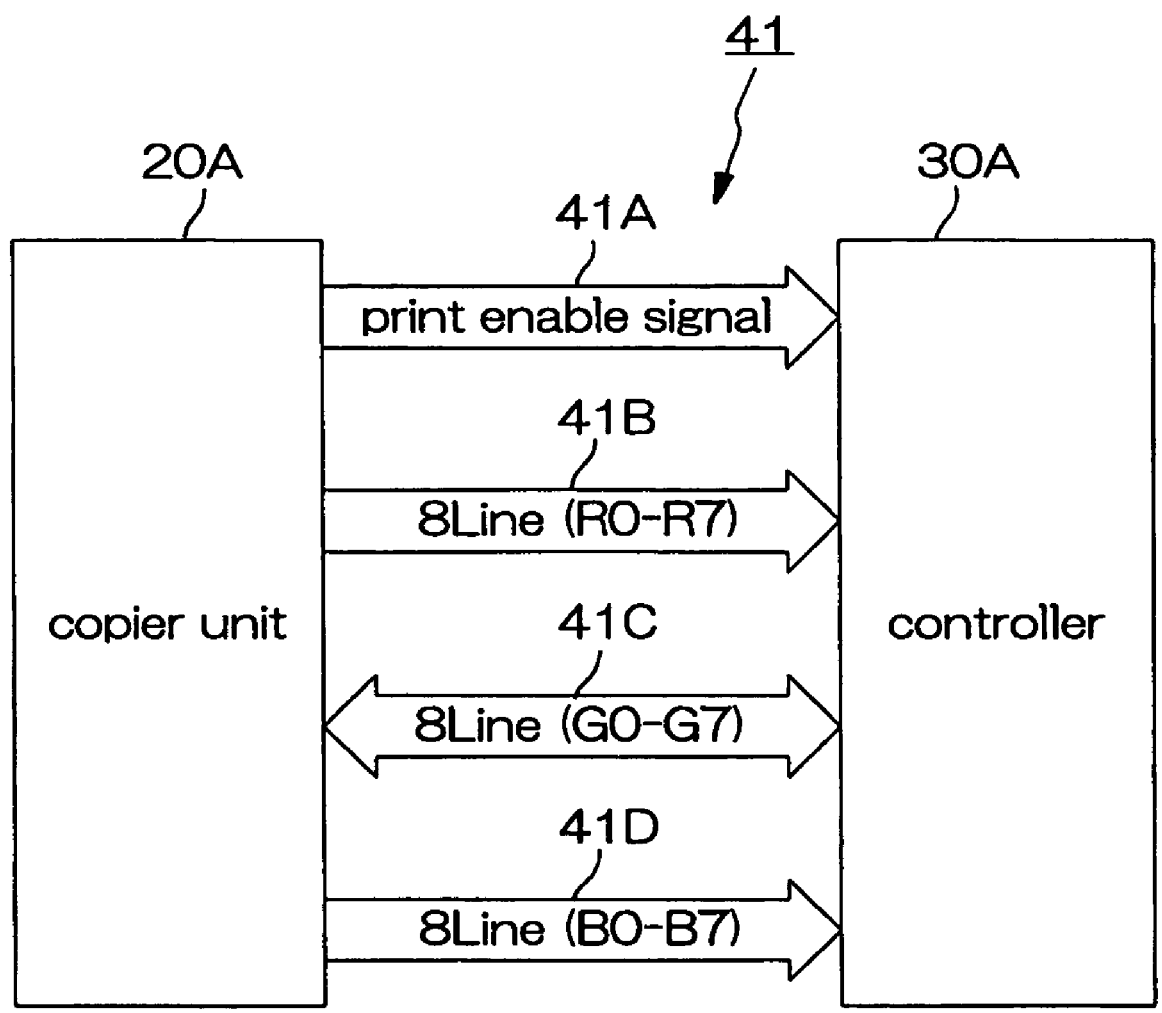
FIG. 4 is a summary block diagram to explain a modified example of the image data transfer.

The digital copying machine 10A shown in FIG. 4 has a copier unit 20A that functions as a copying machine, a controller 30A that controls the transfer of image data between the copier unit 20A and the external computer, and a common bus 41 that connects the copier unit 20A and the controller 30A.

The image reader of the copier unit 20A reads the image of the original document and generates in a parallel fashion R, G and B eight-bit scan image data expressed in terms of 256 gradations per pixel. Therefore, the bus 41 has a signal line 41A through which the print enable signal is transferred and three bus members 41B, 41C and 41D, which correspond to the colors R, G and B, respectively. The bus members 41B, 41C and 41D are respectively used for R, G and B data, and each comprise bound eight signal lines in order to transfer eight-bit image data. In other words, the bus 41 has 24 signal lines for the transfer of image data.

Therefore, in the image reading operation in which scan image data is transferred from the image reader to the external computer, the R, G and B scan image data is simultaneously transferred from the copier unit 20A to the controller 30A. Specifically, the R scan image data, G scan image data and B scan image data are transferred in a parallel fashion to the controller 30 via the eight signal lines comprising the bus member 41B, the eight signal lines comprising the bus member 41C and the eight signal lines comprising the bus member 41D, respectively.

In the printing operation in which print image data is transferred from the external computer to the printing unit, the print image data is transferred from the controller 30A to the copier unit 20A on an individual color basis of C, M, Y and K. Specifically, the print image data is serially transferred to the copier unit 20A via the eight signal lines comprising the bus member 41C used for G data.

Where an image reading operation and a printing operation are carried out at the same time, the R, G and B scan image data is simultaneously transferred to the controller 30A from the copier unit 20A via the bus members 41B, 41C and 41D, respectively, while the print image data is transferred to the copier unit 20A from the controller 30A via the bus member 41C used for G data on an individual color basis of C, M, Y, and K. Alternate transfer of scan image data and print image data using the same bus member 41C is carried out as described above based on the scan enable signal and print enable signal.

In other words, while the total of 16 signal lines of the bus member 41B used for R data and the bus member 41D used for B data are used for the transfer of scan image data only, the eight signal lines of the bus member 41C used for G data are used for the transfer of scan image data as well as the transfer of print image data.

Second Embodiment

Figure 5:
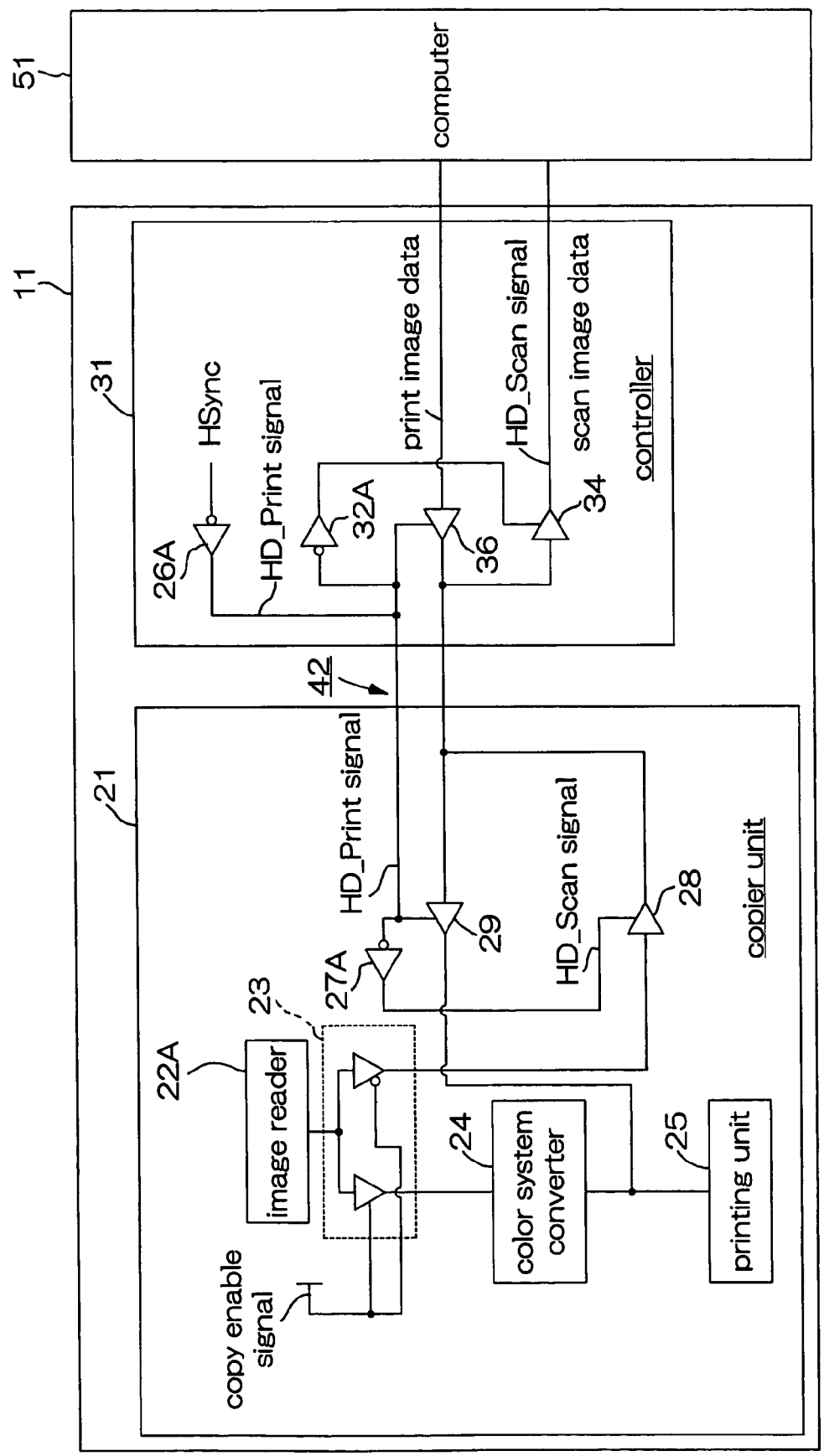
FIG. 5 is a block diagram of a digital coping machine (the second embodiment).

The digital copying machine 11 shown in FIG. 5 has a copier unit 21, a controller 31, and a common bus 42 that connects the copier unit 21 and the controller 31. It alternately transfers scan image data and print image data via the bus 42 based on horizontal synchronization signals that indicate operation timings on a line basis. The second embodiment is therefore different from the first embodiment, which uses clock signals, which are control signals for operation timings on a pixel basis.

Figure 6:
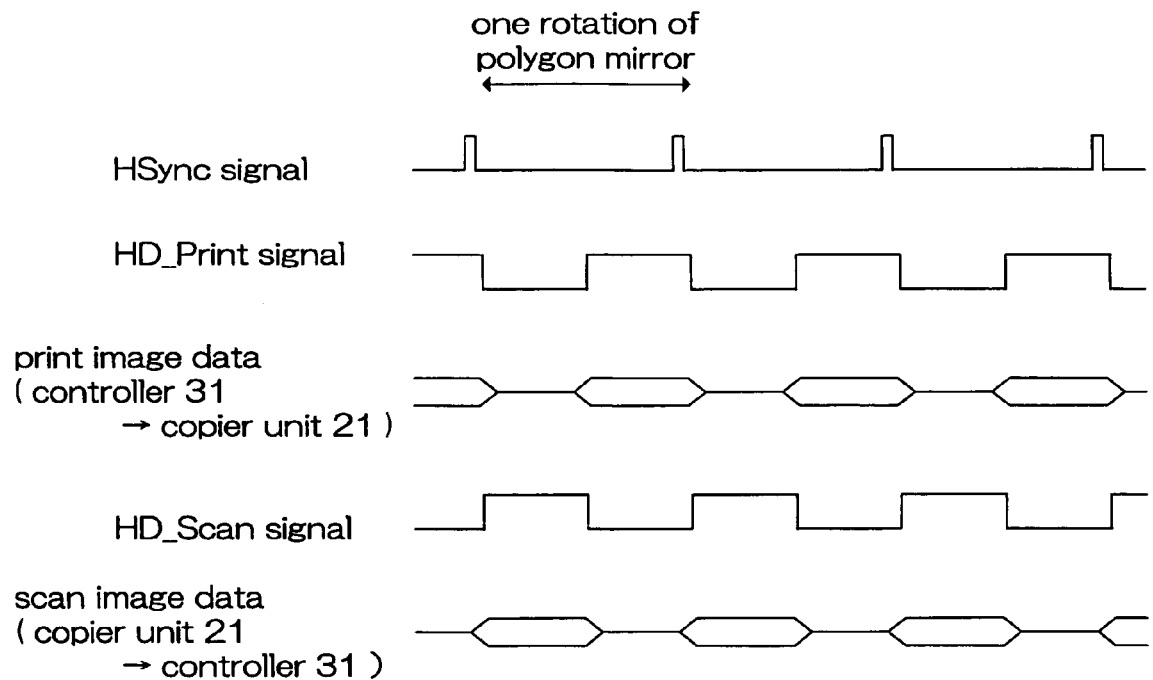
FIG. 6 is a drawing showing the timings for image data transfer.

Specifically, the controller 31 has a first signal generator 26A that generates a HD-print signal based on the detection of an HSync signal shown in FIG. 6. The HSync signal is a reference signal for the print start position for each line that is output each time the polygon mirror of the print head of the printing unit 25 has rotated. The HD-Print signal corresponds to the effective scan area of the polygon mirror, and is a horizontal synchronization signal that shows the timing at which print image data for one line is needed. Where the HD-Print signal is 'HI', print image data is transferred to the copier unit 21 from the controller 31. For example, where one line consists of 500 dots, the frequency of the HD-Print signal is ⅟₅₀₀ of the frequency of the clock signal used in the first embodiment.

The second signal generator 27A of the copier unit 21 and the second signal generator 32A of the controller 31 generates a HD-Scan signal based on the HD-Print signal. Specifically, the HD-Scan signal is a reversal of the HD-Print signal, and is a horizontal synchronization signal that shows the timing for reading of the image of one line of the original document in the main scanning direction. Where the HD-Print signal is 'HI', the scan image data is transferred from the copier unit 21 to the controller 31.

Figure 7:
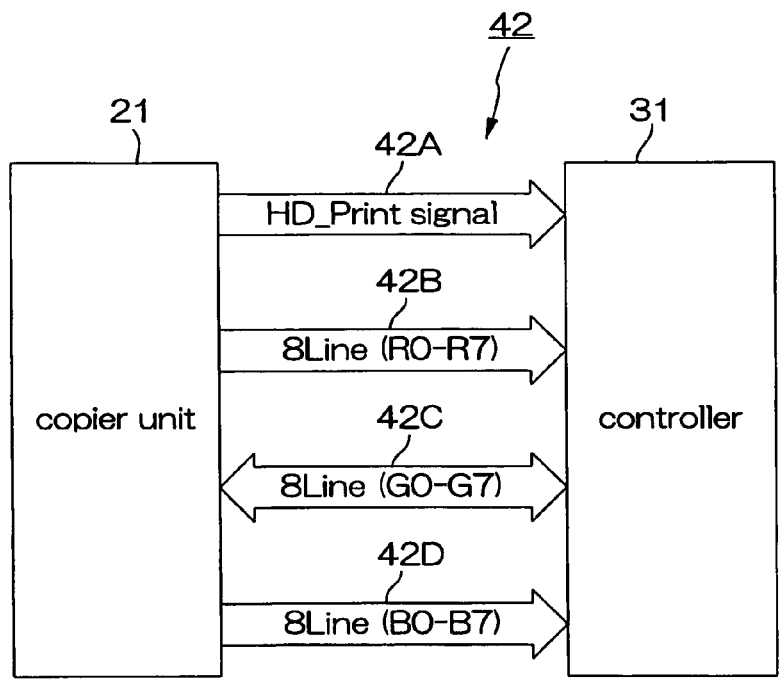
FIG. 7 is a summary block diagram to explain the image data transfer.

The image reader 22A of the copier unit 21 reads the image of the original document and generates in a parallel fashion R, G and B eight-bit scan image data expressed in terms of 256 gradations per pixel. Therefore, as shown in FIG. 7, the bus 42 has a signal line 42A through which the HD-Print signal is transferred from the controller 31 to the copier unit 21, as well as three bus members 42B, 42C, and 42D that correspond to the three colors, R, G and B, respectively. While the bus member 42B used for R data and the bus member 42D used for B data are used for the transfer of scan image data only, the bus member 42C used for G data is used for the transfer of scan image data as well as the transfer of print image data.

In other words, the transfer means in the digital copying machine 11 comprises a first signal generator (horizontal synchronization signal generating means) 26A that generates horizontal synchronization signals and an alternate transfer means that alternately transfers scan image data and print image data via the common bus 42 in response to the rise and fall of the horizontal synchronization signal (a second signal generator 27A, read buffer 28, print buffer 29, second signal generator 32A, read buffer 34 and print buffer 36).

Figure 8:
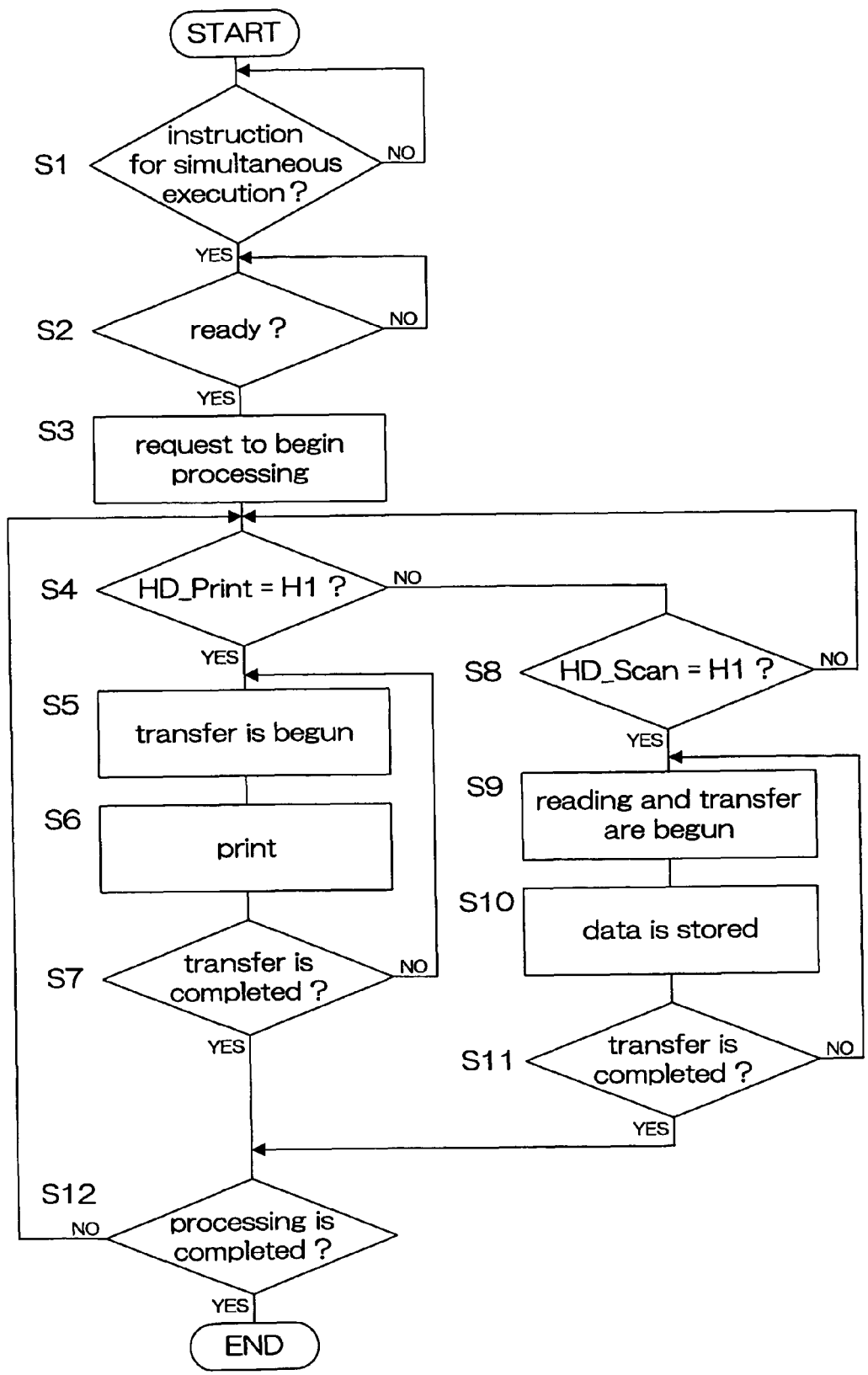
FIG. 8 is a flow chart regarding the image data transfer. In the following description, like parts are designated by like reference numbers throughout the several drawing.

The image data transfer in the case where an image reading operation in which scan image data is transferred from the image reader to the external computer and a printing operation in which printing image data is transferred to the printing unit from the external computer are carried out at the same time will now be explained with reference to the flow chart of FIG. 8.

First, an instruction for simultaneous execution of an image reading operation and a printing operation is issued (S1), and when the copier unit 21 enters the state in which it is ready to simultaneously perform the two operations (S2), the controller 31 requests that the copier unit 21 begin the processing (S3). It is then determined whether the HD-Print signal has risen (S4).

Where it is determined that the HD-Print signal is 'LO', the controller 31 advances to S8. On the other hand, where the HD-Print signal is determined to be 'HI', serial transfer of print image data from the external computer 51 is begun (S5). In other words, the print image data is transferred, via the bus member 42C used for G data on an individual color basis of C, M, Y and K, from the controller 31 to the printing unit 25. The printing unit 25 then prints out the print image data (S6). It is then determined whether or not the transfer of print image data for one line has been completed (S7). Where it is determined that the transfer of print image data for one line has not been completed, the controller 31 returns to S5. On the other hand, where it is determined that the transfer of print image data for one line has been completed, the controller 31 advances to S12.

In S8, it is determined whether the HD-Scan signal has risen. Where it is determined that the HD-Scan signal is 'LO', the controller 31 returns to S4. On the other hand, where it is determined that the HD-Scan signal is 'HI', parallel transfer of scan image data from the image reader 22A is begun (S9). In other words, reading of the original document image is begun and the R, G and B scan image data generated is simultaneously transferred to the controller 31 via the bus members 42B, 42C and 42D, respectively. The scan image data is then stored in the read buffer 34 of the controller 31 so that it may be transferred to the external computer 51 (S10). It is then determined whether or not the transfer of scan image data for one line has been completed (S11). Where it is determined that the transfer of scan image data for one line has not been completed, the controller 31 returns to S9. On the other hand, where it is determined that the transfer of scan image data for one line has been completed, the controller 31 advances to S12.

In S12, it is determined whether or not the processing for one page has been completed (S12). Where it is determined that processing for one page has not been completed, the controller 31 returns to S4. On the other hand, where it is determined that the processing for one page has been completed, the process is ended.

As described above, scan image data and print image data are alternately transferred on an individual line basis based on a horizontal synchronization signal that shows the operation timing for each line. Therefore, an image reading operation and a printing operation may be simultaneously carried out using the same bus.

In the second embodiment, where the scanning efficiency of the polygon mirror of the print head in the printing unit 25 is high, the period of time required for the transfer of print image data increases in terms of the percent of one cycle of the HSync signal, while the time available for the transfer of scan image data is reduced. However, this may be dealt with by, for example, increasing the frequency of the pixel clock used for the transfer of scan image data higher than the frequency of the pixel clock used for the transfer of print image data.

Using the embodiments explained above, an image reading operation in which scan image data is transferred to the external computer from the image reader and a printing operation in which print image data is transferred to the printing unit from the external computer may be carried out at the same time using the same bus.

'Simultaneously' or 'at the same time' means that an image reading operation and a printing operation progress parallel to each other, and does not mean that data transfers in opposite directions take place strictly at the same point in time in the common bus.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A digital copying machine comprising:
    an image reader that reads an image of an original document and generates scan image data,
    a printing unit that prints based on print image data,
    a controller through which the scan image data and the print image data are exchanged with an external computer,
    an internal bus that transmits the scan image data generated by the image reader to the controller and that transmits the print image data from the controller to the printing unit,
    a signal generator that generates a signal based on an operation timing of the printing unit, and
    a switch that, in response to the signal, switches the internal bus between transmission from the image reader to the controller and transmission from the controller to the printing unit.

2. A digital copying machine as claimed in claim 1, said signal generated by the signal generator is a clock signal issued based on an operation timing for each pixel.

3. A digital copying machine as claimed in claim 1, said signal generated by the signal generator is a horizontal synchronization signal issued based on an operation timing for each line.

4. A digital copying machine as claimed in claim 1, said internal bus includes a read buffer that temporarily stores the scan image data read by the image reader.

5. A digital copying machine as claimed in claim 1, said internal bus includes a print buffer that temporarily stores the print image data sent by the external computer.

6. The digital copying machine of claim 1, wherein the switch switches the bus between transmission from the image reader to the controller and transmission from the controller to the printing unit and back again repeatedly and at predetermined fixed intervals.

7. A digital copying machine comprising:
    an image reader that reads an image of an original document and generates scan image data,
    a printing unit that prints based on print image data,
    a controller through which the scan image data and the print image data are exchanged with an external computer,
    an internal bus that transmits the scan image data generated by the image reader to the controller and that transmits the print image data from the controller to the printing unit,
    a read buffer that temporarily stores the scan image data read by the image reader, a print buffer that temporarily stores the print image data sent by the external computer, a signal generator that generates horizontal synchronization signals issued based on an operation timing for each line in the printing unit, and a switch that, in response to a rise and a fall of the horizontal synchronization signals, switches the internal bus between transmission from the image reader to the controller and transmission from the controller to the printing unit, whereas scan image data for one line taken out of the read buffer and print image data for one line taken out of the print buffer are alternately transferred via the bus.

8. The digital copying machine of claim 7, wherein the switch switches the bus between transmission from the image reader to the controller and transmission from the controller to the printing unit and back repeatedly and at predetermined fixed intervals.

9. An image data transfer method which is performed in a digital copying machine having an image reader that reads an image of an original document and generates scan image data, a printing unit that prints based on print image data, a controller through which the scan image data and the print image data are exchanged with an external computer, and an internal bus that transmits the scan image data generated by the image reader to the controller and that transmits image data from the controller to the printing unit, said method comprising the steps of:

generating a signal based on an operation timing of the printing unit, and switching, in response to the signal, the internal bus between transmission from the image reader to the controller and transmission from the controller to the printing unit.

10. An image data transfer method as claimed in claim 9, said signal generated, by a signal generator, is a clock signal issued based on an operation timing for each pixel.

11. An image data transfer method as claimed in claim 9, said signal generated by the signal generator is a horizontal synchronization signal issued based on an operation timing for each line.

12. An image data transfer method as claimed in claim 9, wherein said internal bus includes a read buffer that temporarily stores the scan image data read by the image reader.

13. An image data transfer method as claimed in claim 9, wherein said bus includes a print buffer that temporarily stores the print image data sent by the controller.

14. The method of claim 9, comprising switching the bus between transmission from the image reader to the controller and transmission from the controller to the printing unit and back again repeatedly and at predetermined fixed intervals.

* * * * *